United States Patent
Naciri et al.

(10) Patent No.: US 8,652,352 B2
(45) Date of Patent: Feb. 18, 2014

(54) PHOTORESPONSIVE NANOPARTICLES AS LIGHT-DRIVEN NANOSCALE ACTUATORS

(71) Applicants: Jawad Naciri, Arlington, VA (US); Jing C. Zhou, Alexandria, VA (US); Banahalli R. Ratna, Alexandria, VA (US)

(72) Inventors: Jawad Naciri, Arlington, VA (US); Jing C. Zhou, Alexandria, VA (US); Banahalli R. Ratna, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/973,062

(22) Filed: Aug. 22, 2013

(65) Prior Publication Data
US 2013/0334475 A1  Dec. 19, 2013

Related U.S. Application Data

(62) Division of application No. 12/985,924, filed on Jan. 6, 2011, now Pat. No. 8,557,140.

(51) Int. Cl.
*C09K 19/38* (2006.01)
*C09K 19/24* (2006.01)
*C09K 19/52* (2006.01)
*C09K 19/54* (2006.01)
*C08F 20/06* (2006.01)
*C08F 20/68* (2006.01)

(52) U.S. Cl.
USPC ............. 252/299.01; 252/299.5; 252/299.68; 526/312; 977/725

(58) Field of Classification Search
USPC ............. 252/299.01, 299.5, 299.68; 977/725; 526/312
See application file for complete search history.

(56) References Cited

U.S. PATENT DOCUMENTS 8,557,140 B2 * 10/2013 Naciri et al. ............. 252/299.01
2008/0021416 A1 * 1/2008 Arai et al. ...................... 604/271
2010/0016608 A1 * 1/2010 Irie et al. ....................... 548/202

* cited by examiner

*Primary Examiner* — Shean C Wu
(74) *Attorney, Agent, or Firm* — US Naval Research Laboratory; Roy Roberts

(57) ABSTRACT

Photoresponsive shape memory nanoparticles have a layered smectic ordering and include a photoresponsive moiety selected from the group consisting of azobenzene, stilbene, and spiropyran. Multiple cycles of contraction and extension in these materials can be controlled by UV and visible light. By changing light intensity and exposure time, the magnitude of actuation can be modulated.

10 Claims, 6 Drawing Sheets

Monomer: A9AB9

Crosslinker: DA9AB

Surfactant: AC10COONa

Monomer: A9AB9

Crosslinker: DA9AB

Surfactant: AC10COONa

PHOTORESPONSIVE NANOPARTICLES AS LIGHT-DRIVEN NANOSCALE ACTUATORS

CROSS-REFERENCE TO RELATED APPLICATIONS

This application claims benefit as a divisional application of U.S. patent application Ser. No. 12/985,924 filed on Jan. 6, 2011, which is incorporated herein by reference.

BACKGROUND

A need exists for a nano-scale material that can change shape in response to light.

BRIEF SUMMARY

In one embodiment, a method of actuating includes irradiating an photoresponsive particle actuator with ultraviolet light thereby causing the photoresponsive particle actuator to contract in at least one dimension, and irradiating the photoresponsive particle actuator with visible light thereby causing the photoresponsive particle actuator to expand in the same at least one dimension, wherein the photoresponsive particle actuator has a layered smectic ordering and the expansion and contraction are obtained via the presence of a photoresponsive moiety selected from the group consisting of azobenzene, stilbene, and spiropyran. The contraction and expansion may be performed repeatedly.

In another embodiment, photoresponsive particle actuator includes a particle having a layered smectic ordering and having a photoresponsive moiety selected from the group consisting of azobenzene, stilbene, and spiropyran, wherein the particle is less than about one micron in diameter and exhibits a reversible shape change upon exposure to light.

In a further embodiment, a method of making photoresponsive particle actuators includes (a) combining at least two polymer precursors with an aqueous solution comprising a surfactant to form an emulsion, and (b) crosslinking the emulsion to create photoresponsive particle actuators, wherein the photoresponsive particle actuators have a layered smectic ordering and include a photoresponsive moiety selected from the group consisting of azobenzene, stilbene, and spiropyran, and wherein the photoresponsive particle actuators are less than about one micron in diameter and exhibit a reversible shape change upon exposure to light.

In a preferred embodiment, the photoresponsive moiety is azobenzene, and it is flanked by alkyl chains having from 4 to 10 carbons.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "photoresponsive moiety" refers to a chemical moiety can reversibly change conformation upon exposure to light energy. Examples of such moieties include azobenzene, stilbene, and spiropyran.

When the terms "nanoparticle" and "nanocolloid" and their respective plural forms are used herein, unless expressly indicated otherwise these terms encompass materials having larger than nano-scale dimensions, including, for example, a micro-sized scale (i.e., less than about one millimeter), in addition to nano-scale materials.

Description

Figure 1:
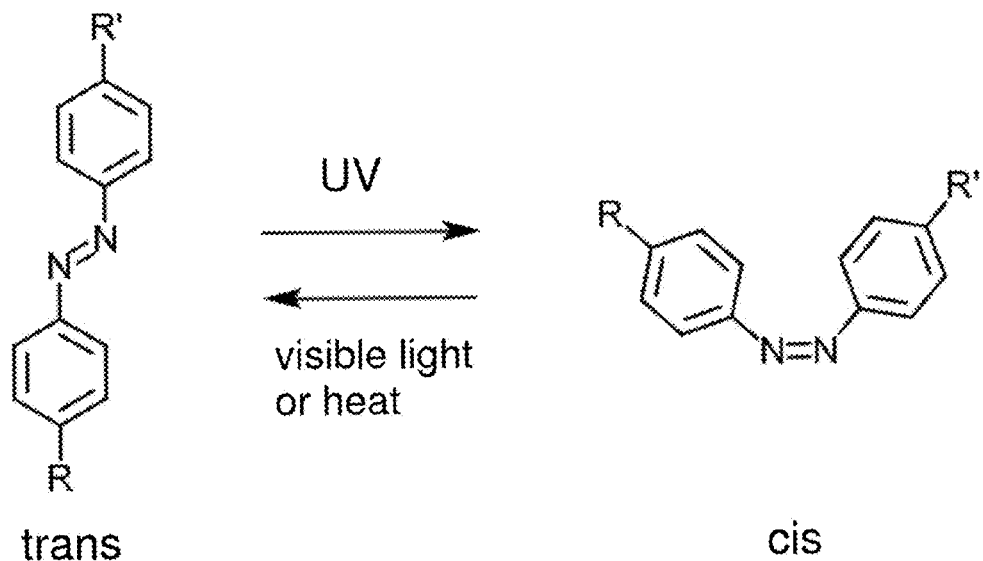
FIG. 1 shows an example of trans/cis transformation with an azobenzene moiety.

The photoresponsive moieties azobenzene, stilbene, and spiropyran can reversibly change conformation upon exposure to light energy. For purposes of illustration, FIG. 1 depicts the trans/cis transformation of azobenzene, a molecule with two phenyl rings joined by an azo linkage. The aromatic cores are rigid and the molecules exhibit liquid crystalline properties. The reversible photo-induced isomerization behavior of azobenzene is further described in documents 1 and 2 (a list of cited documents, each of which is incorporated herein by reference, follows this description). When exposed to ultraviolet (UV) light, the molecule switches from a linear and thermally stable trans conformation to a bent and meta-stable cis conformation. The photo-induced isomerization takes place in the order of pico seconds. The cis configuration can thermally relax to the trans state. Depending on the ring-substitution pattern, the relaxation time can vary considerably. The cis to trans back isomerization can also be induced with visible light.

Photo-switching behavior of azobenzene has been exploited to make "smart" materials responsive to light.

Azobenzene has been incorporated into polymer films by either doping or crosslinking. Photo induced molecular motion causes structural change in the polymer, which lead to shape change in the bulk material. Among the various types of photoresponsive polymer films, azobenzene-based liquid crystalline elastomers (LCEs) showed greatest mechanical effects. These elastomers are composed of azo derivitized molecules aligned and crosslinked in liquid crystalline state. Upon UV irradiation, cooperative motion of azobenzene reduces molecular order and causes contraction of LCE film along the direction of molecular alignment, described in documents 3 and 4. Two dimensional bending and unbending motions of polymer films has also noted in documents 5 through 7, wherein polarized light sources were used to induce contraction only along the direction of molecular alignment, with the bending motions reversed using a visible light.

Shape memory behavior in nanocolloids has been reported in one paper, document 11. These nanocolloids are formed by main-chain LC polymers and due to the nematic alignment of the polymer chains, the nanocolloids are intrinsically ellipsoidal in shape. As the nanocolloids were heated from room temperature to 101° C., the nanocolloids became spherical as the polymer changed from nematic to isotropic phase. The nanocolloids returned to the ellipsoidal shape when cooled back down to room temperature. Such thermal-driven shape memory process is slow and requires heating to high temperature, and this is not convenient for practical applications.

Shape-changing nanocolloids have been reported in documents numbered 8-10, and 16. These documents variously describe colloidal spheres formed by self-assembly of amphiphilic copolymers containing azobenzene moieties. Upon irradiation with a laser, the colloidal spheres exhibited photo-induced elongation along the polarization direction the laser light.

Although the work done in, e.g., documents 8 through 10 uses polymers containing azobenzene moieties and thus have certain similarities to the material described herein, the above-noted polymers were prepared using different methods from that described herein, and as a result, those nanoparticles have different structures. The photoresponsive particle actuators described herein possess a layered smectic ordering which forms an elastomer after crosslinking. Unlike previously-described materials, the innovative materials described herein exhibits a consistent and reversible shape change controlled by light. They further enjoy superior properties as compared to actuators controlled by heat (disclosed in document 11), it that they operate more quickly and can be readily actuated from a remote distance. Moreover, as compared to the materials described in documents 8 through 10, although those documents used light to change the shape of the nanoparticles, the described shape change was very slow and reversability of the shape change was not demonstrated.

Figure 2:
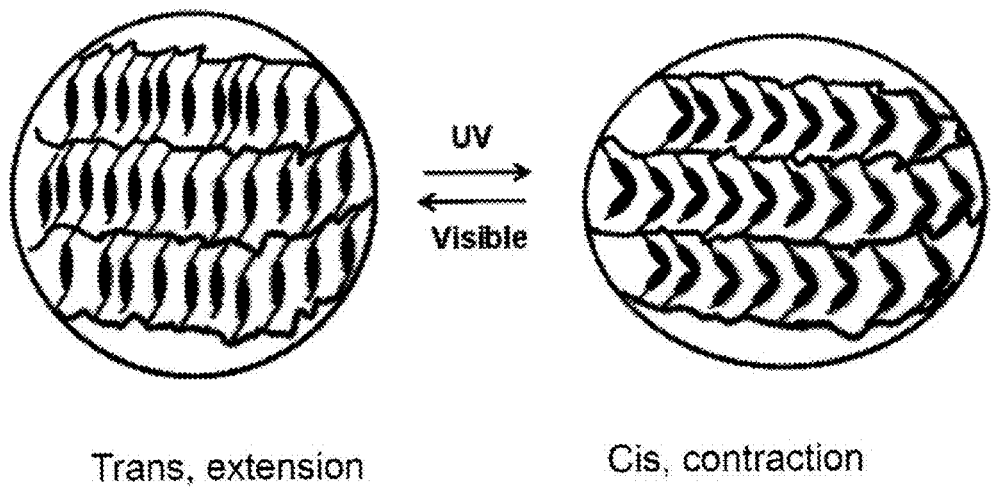
FIG. 2 is a schematic drawing of a nanoparticle with liquid crystal azobenzene moieties illustrating how the material contracts and extends upon exposure to ultraviolet (UV) and visible light.

As described herein, nanocolloids were fabricated using monoacrylate and diacrylate monomers containing the azobenzene moiety. It is expected that other photoresponsive moieties, including stilbene and spiropyran, could be used in place of azobenzene. During a mini-emulsion process, the components are aligned and crosslinked in smectic phase, taking on a structure corresponding to that of a liquid crystal (LC) elastomer, seen schematically in FIG. 2. The micelles depicted in FIG. 2 are stabilized by surfactants (not shown) that encapsulate the crosslinked material. Upon UV exposure, trans to cis isomerization of the aligned photoresponsive moieties triggers cooperative motion and an accompanying change in shape. A subsequent exposure to visible light, the photoresponsive moieties switch back from cis to trans conforms and the nanoparticle restores its original shape.

Figure 3:
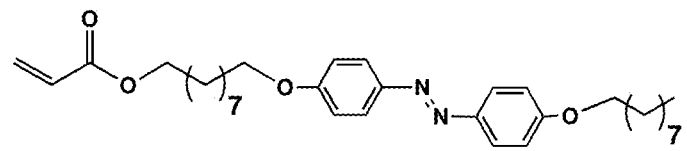
FIG. 3 provides chemical structures of exemplary azobenzene polymer precursors and a surfactant used to synthesize certain azobenzene liquid crystal nanoparticles.
Figure 3:
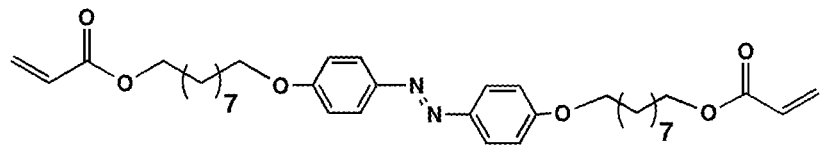
Figure 3:
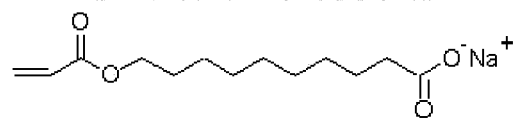

As described in greater detail in the Examples, the components illustrated in FIG. 3 were used to create the nanoparticles. The depicted components have an acrylate moiety used both to form the "backbone" of the polymerized monomers and to cross-link the material. In the case of the components shown in FIG. 3, the backbone arises from the acrylate moieties on the left side of the illustrations of A9AB9 and DA9AB, while the acrylate moieties on the right side of DA9AB and the left side of the surfactant act as cross-linkers.

Alternative chemistry can be used for the backbone and/or for the cross-linking instead of the acrylate used in A9AB9 and DA9AB. The backbone can utilize siloxane chemistry (in the case of a polysiloxane backbone), or the backbone can be polynorbornene, optionally while using acrylate as a cross linker. Other crosslinking moieties include vinyl ether and epoxide. The crosslinker and backbone chemistry can be combined in various ways as desired. For example, polysiloxane or polynorbornene can be used as backbones with acrylates cross-linkers to form the elastomer network. Crosslinking density can be varied to produce nanoparticles with different stiffness and actuation properties. Various guest species such as drug molecules or dye molecules can be incorporated into the polymer matrix for additional functions.

Other variations are possible in the components used to create photoresponsive particles. For example, photoresponsive moieties including azobenzene, stilbene, and spiropyran are expected to create nanoparticles with the desired properties disclosed herein. The length of the alkane chains is believed to be critical in order to form the smectic ordering in the nanoparticles, and further affects the solubility of the polymer in solvent. Accordingly, in one aspect the photoresponsive moiety is flanked by alkyl chains having from 4 to 10 carbons. For example, a can be prepared from components that comprise a photoresponsive moiety flanked by a hexane, heptane, or octane moiety. In a preferred embodiment, the flanking moiety is heptane, as used in the monomer A9AB9 and crosslinker DA9AB depicted in FIG. 3. In another aspect the alkane chain is of different sizes on either side of the azobenzene moiety.

The photoresponsive particles can be designed to have sizes range from 50 nm to hundreds of nanometers or, if desired, particles having a size of several microns or larger. In one embodiment, no dimension of the photoresponsive particle is greater than about one micron. Monodispersed nanoparticles, if desired, can be obtained simply by centrifugation or other separation techniques. In embodiments, a photoresponsive particle has a generally spherical shape, or that of an oblate spheroid.

The actuator described herein provides a new opportunity for conversion of light energy to mechanical energy at the nano-scale. The actuation generated in the photoresponsive particle actuators described herein is fast, efficient, reversible, and controllable. Unlike thermally-driven shape change material, in this case the mechanism is driven by light, a clean energy. Preparation of azobenzene nanoparticles occurs through self-assembly and can be tailored for specific functions.

The surfactant used to stabilize the photoresponsive particle actuator is not limited to carboxylate as a capping agent. Alternatives include sulfonate, imidazole and amine, which can provide different surface charges. The various capping groups can also be further conjugated with PEG, biomarkers, recognition peptides to further enhance biocompatibility and targeting properties.

The photoresponsive particle actuators described herein may be used in a wide range of applications. The material is expected to be biocompatible and may be used in biomedical applications such as light controlled flow regulation in a microfluidic channel or light triggered drug delivery. Light-driven structural and shape change can lead to triggered drug release and dye color change. Other applications include microelectromechanical systems (MEMS), nanoactuators, tunable photonics, and sensors.

In one exemplary embodiment, a photoresponsive particle as described herein is employed as a switchable closure for a compartment, so that light energy either opens or closes the compartment to allow contents thereof to move in or out. In another exemplary embodiment, a photoresponsive particle as described herein is incorporated as an actuator into a MEMS device, for example a silicon MEMS device, where it might serve a function as a sensor.

EXAMPLES

Synthesis of Azobenzene LC Nanoparticles

The polymer precursors A9AB9 and DA9AB along with the surfactant AC10COONa were used, with the structure of each shown in FIG. 3. The azobenzene nanoparticles were synthesized using a mini-emulsion process. Similar processes have been described in documents 12 through 14. To prepare the instant nanoparticle, 15 mg of surfactant AC10COONa was dissolved in 10 ml of water. 20 mol % of A9AB9 and 80 mol % of DA9AB were mixed with 2 w % 2,2'-azoisobutyronitrile (AIBN) in 2 g of chloroform. The solution was added drop by drop to the surfactant solution and stirred for 1 hour. The mixture was then sonicated in an ice bath for 2 minutes at 90% amplitude using an Ultrasonic Processor (ACE Glass, Inc) with a probe (Model LV261). The resulting mini-emulsion was stirred at room temperature with $N_2$ bubbled into it for 15 min to remove oxygen. With continuous stirring and bubbling of $N_2$, the emulsion was then heated in an oil bath at 64° C. for 6 hours to remove chloroform and promote polymerization. A nanocolloid suspension comprising the desired nanoparticles was obtained.

The nanocolloid suspension was centrifuged to remove excess surfactants and materials that did not polymerize into nanoparticles. 0.5 ml of raw suspension was diluted with 0.25 ml of water and centrifuged at 2000 rpm (Eppendorf Centrifuge 5415R) for 10 min. After discarding the pellet, the supernatant was then centrifuged at 6000 rpm for 30 min and the supernatant was discarded. The pellet was resuspended in 0.5 ml of water and kept at room temperature until further analysis.

Characterization of Azobenzene LC Nanoparticles

Gold coated mica substrate was first functionalized with primary amine by immersion into 1 mM cystamine in water for 1 hour. The functionalized gold substrate was rinsed with water and immersed into diluted processed nanocolloid suspension for 10 min. The substrate was rinsed with water again and blow dried with $N_2$.

Scanning electron microscopy (SEM) of the LC nanoparticles adsorbed on gold substrate was performed using Leo Supra 55 (Carl Zeiss SMT AG).

UV/vis spectra of the azobenzene nanoparticles were recorded with Cary 5000 UV-Vis-NIR spectrophotometer. The nanocolloid suspension was diluted in water and kept in dark for two days before taking the spectrum to ensure all the azobenzene moieties were in the trans conformation. UV/vis spectra were taken before light exposure, after exposure to 9.7 mW 360 nm UV (Mercury lamp, Oriel with 360 nm band filter, Edmund Optics) for 2 min and then after exposure to 4.4 mW 450 nm blue light (Mercury lamp, Oriel with 450 nm band filter, Edmund Optics) for 2 min.

For atomic force microscopy (AFM), a MultiMode AFM with Nanoscope Ma controller (Digital Instruments) was used to obtain topographic images of LC nanoparticles. A silicon SPM sensor (NanoWorld AG, FMR, 75 KHz, 2.8 N/m) was used. The tapping mode images were recorded immediately after the light source for irradiation was turned off.

The light sources were either collimated or expanded using a fiber light guide into a 10 mm beam illuminating the entire substrate sample mounted on AFM scanner. An Omicron LEDMOD365.250.LAB coupled with 2 mm fiber (LEDMOD.FASY.OEM) feeding through a collimating lens was used as 365 nm UV source. A Fiberoptics GmbH (Fibo Tec) coupled with 1 mm fiber and collimating lens was used as the 430 nm blue light source. An ARIES-100 portable laser module (Laserglow Technologies) with output wavelength of 532 nm was used as the green light source. Both the blue and green laser beams were expanded by feeding through a 13 mm fiber optic light guide. The optical powers of the light sources coming out of either the collimating lens or the fiber light guide were measured using Newport optical power meter 1830C with 818-UV sensor and 883-UV attenuator.

In order to observe the actuation properties, individual azobenzene nanoparticles were deposited on gold substrate and mounted on AFM scanner. A height image of a 3 µm×3 µm area containing several nanoparticles was first recorded using tapping mode in room light. Then scanning was stopped, an illuminating light source was turned on and irradiated the sample for 10 s of seconds and then turned off. The same area was scanned again with tapping mode. All the imaging was done in ambient conditions (24° C., 40% RH).

Experimental Results

Figure 4:
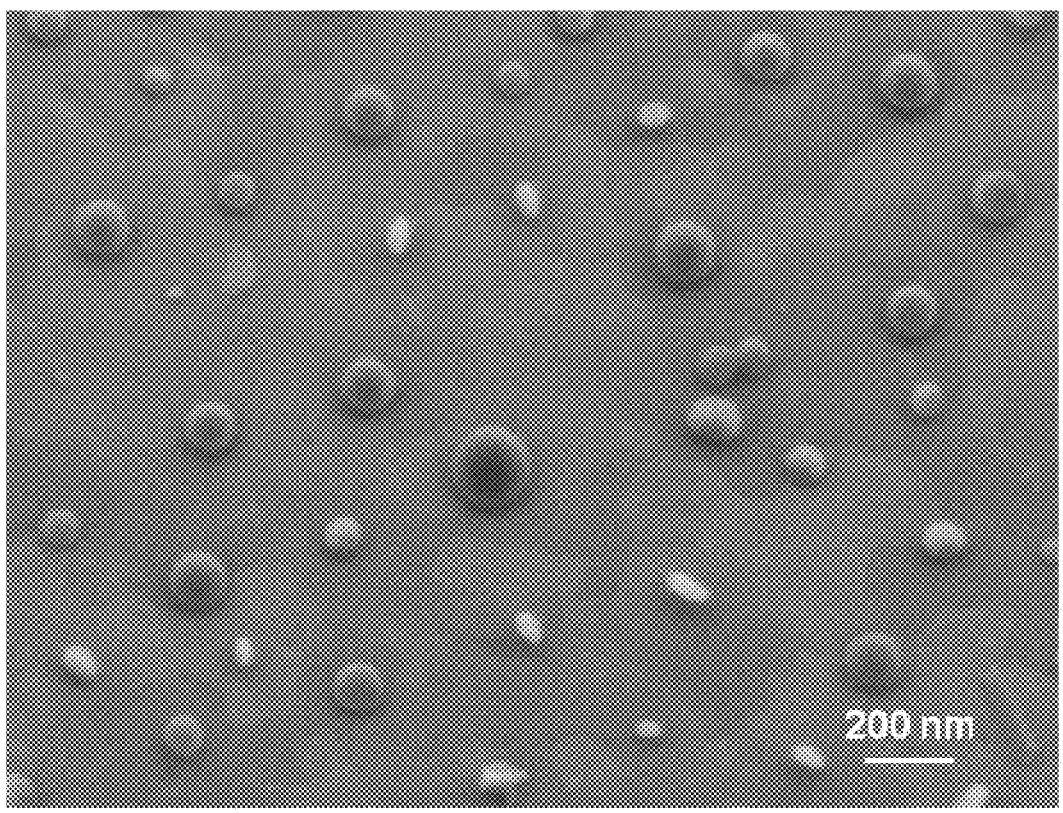
FIG. 4 is a scanning electron microscopy (SEM) image of azobenzene nanoparticles adsorbed on amine functionalized gold surface.

Azobenzene LC nanoparticles were prepared as described above. Such a mixture in bulk exhibited smectic phase between 89° C. and 60° C. and glass transition temperature of the polymerized film was around 30° C. Stable nanoparticles were formed at the end of the process and immobilized on amine-functionalized gold substrate. SEM images showed that these particles are shaped like disks, as seen in FIG. 4. Some of the nanoparticles were lying flat on the surface and show a circular top view, while others are on their sides and show standing on the side of the disk, showing profiles like elongated rods. These results were also confirmed by AFM images. The nanoparticles are polydispersed with height ranged from 50 nm to 130 nm and diameter from 60 nm to 200 nm.

Trans/cis isomerization in the azobenzene nanoparticles was first studied in water suspension by spectrophotometry. UV/vis spectra of the nanoparticles kept in dark for two days showed a strong absorption peak at 330 nm ($\pi \Rightarrow \pi^*$) and a very weak band at 450 nm ($n \Rightarrow \pi^*$). After the nanocolloid suspension was exposed to 360 nm UV, there was a significant decrease in peak at 360 nm and a slight increase of absorption at 450 nm. This result indicated there was trans to cis isomerization in these azobenzene nanoparticles upon UV exposure. After a subsequent exposure to 450 nm blue light, the two peaks regained the original intensity, indicating complete cis to trans back isomerization.

Figure 5:
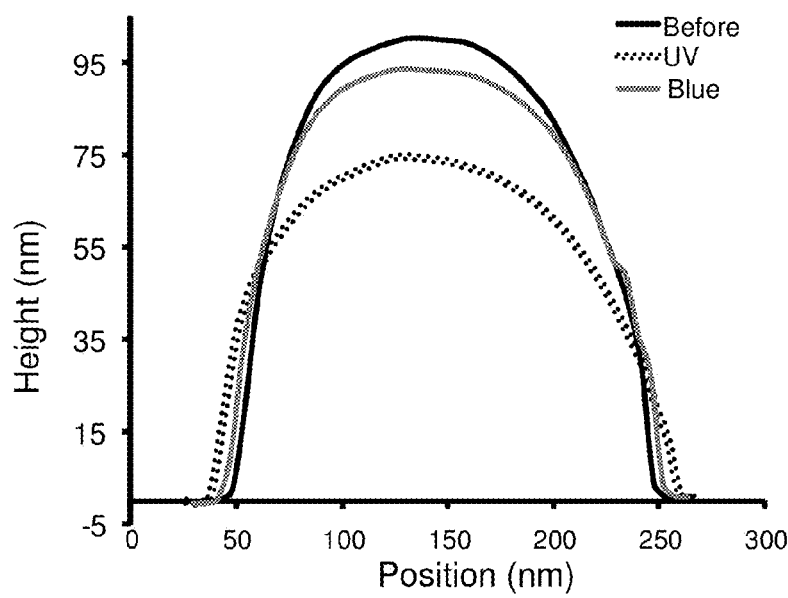
FIG. 5 shows a height profile of a nanoparticle before and after irradiation with UV (19 mW/cm$^2$, 30 sec) and then after irradiation with blue light (4.5 mW/cm$^2$, 60 sec).

The azobenzene nanoparticles exhibited a dimensional change in response to light. Nanoparticles were deposited on a gold substrate which was mounted on AFM scanner. Tapping mode images of a substrate area containing several nanoparticles were recorded before and after series of irradiation. Typical AFM height profiles of a nanoparticle before exposure to UV, after exposure to 365 nm UV (19 mW/cm$^2$, 30 sec) and then after exposure to 430 nm blue light (4.5 mW/cm$^2$, 60 sec) are shown in FIG. 5. The nanoparticle decreased in height and increased in diameter after irradiation with UV. After a subsequent exposure to blue light, the nanoparticle recovered height and diameter.

Figure 6:
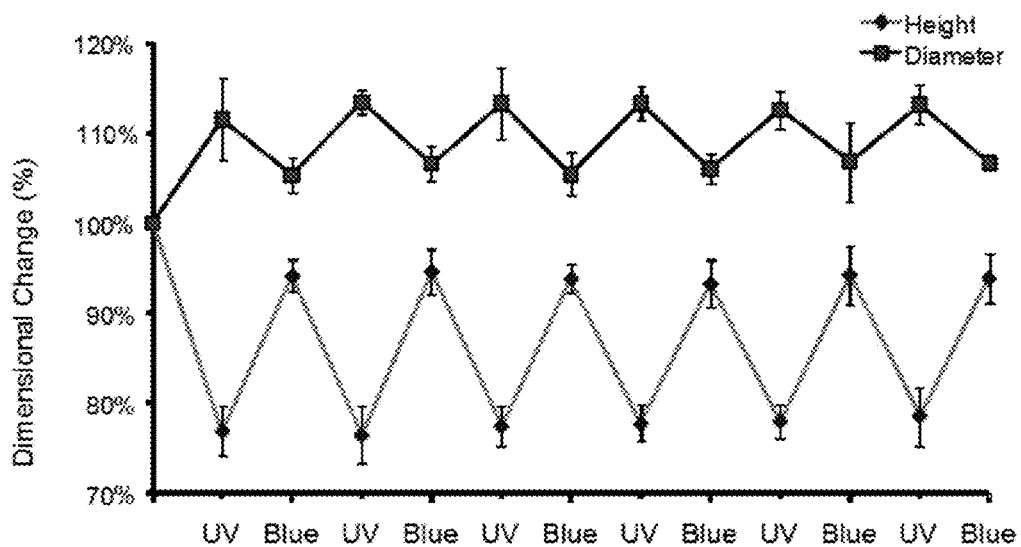
FIG. 6 illustrates average percent height and diameter change in five nanoparticles after exposure to alternating UV and blue light.

When irradiated with alternating UV and blue light, the nanoparticles exhibited consistent cycles of contraction and extension. FIG. 6 shows average percent height and diameter change in five nanoparticles with sizes ranging from 60 to 100 nm. After the initial polymer training cycle, the nanoparticles showed about 24% height reduction accompanied by 10% diameter expansion upon UV exposure, with complete dimensional recovery occurring upon blue light exposure. The magnitude of actuation (average height at extension—average height at contraction) was about 20%. It is expected that one of ordinary skill in the art may refine this system so that the magnitude of actuation is greater than about 20%.

The actuation was repeated for up to six cycles and no change in the actuation magnitude was observed. The same experiments were repeated with nanoparticles at different locations on the same substrate and with substrate samples made on different dates containing nanoparticles aged in water suspension for up to 37 days. Consistent results were obtained within each substrate sample. The magnitude of maximum actuation from different substrate samples ranged from 10% to 20%. Similar results were also obtained with alternating UV and 530 nm green light.

Figure 7A:
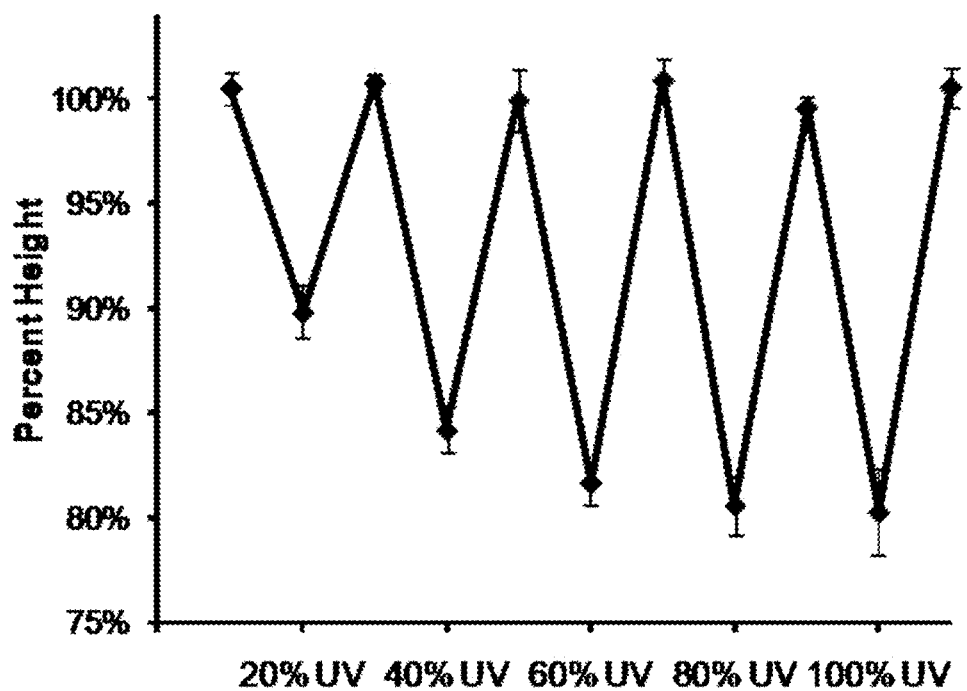
FIG. 7A shows height change of azobenzene nanoparticles in response to 100% power output with UV intensity of 19 mW/cm$^2$ and FIG. 7B shows height changes in response to UV exposure time change.

The effect of UV intensity and exposure time on the contraction magnitude of the nanoparticles was examined. During these experiments, 360 nm UV of various intensities illuminated the sample for 20 seconds to induce contractions. After each contraction, a consistent green light source (530 nm, 40 mW/cm$^2$, 30 sec) was used to obtain maximum extension restore the nanoparticles to their original shapes. The nanoparticle showed increased amount of contraction with increased UV intensity until the contraction reached to a maximum at about 20% of initial height with 4.5 mW/cm$^2$ UV intensity (100% power output), as seen in FIG. 7A.

The nanoparticles exhibit shape memory characteristics, with shape recovery in four hours when the nanoparticles were kept in dark at ambient conditions after contraction was induced. This recovery is believed to be thermally driven.

Figure 7B:
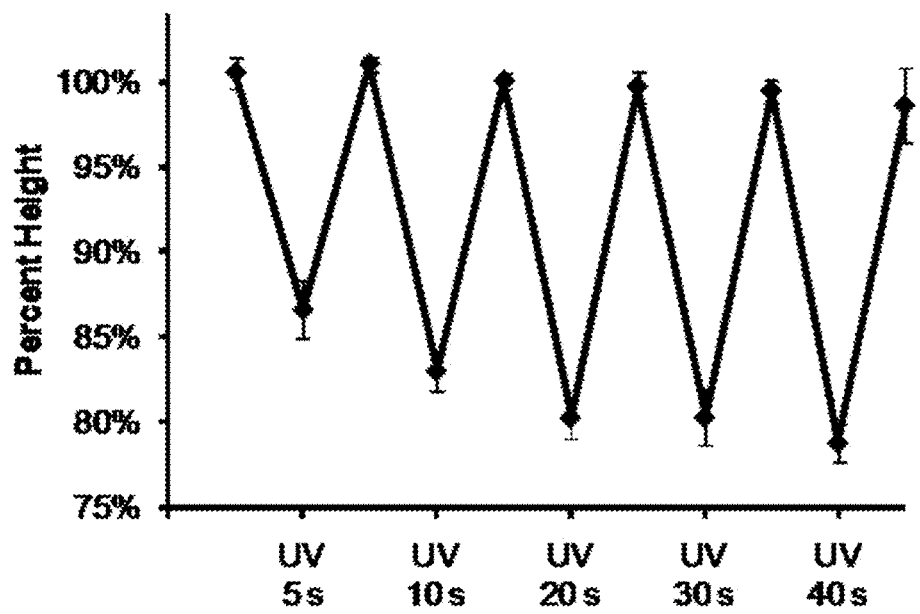

Contraction magnitude of the nanoparticles was also affected by UV irradiation time. With the UV light intensity maintained at 19 mW/cm$^2$, the exposure time was varied from 5 to 40 sec. Increased UV exposure time caused the nanoparticle to contract with greater magnitude until it reached maximum at 30 seconds of UV irradiation, as seen in FIG. 7B.

Figure 8A:
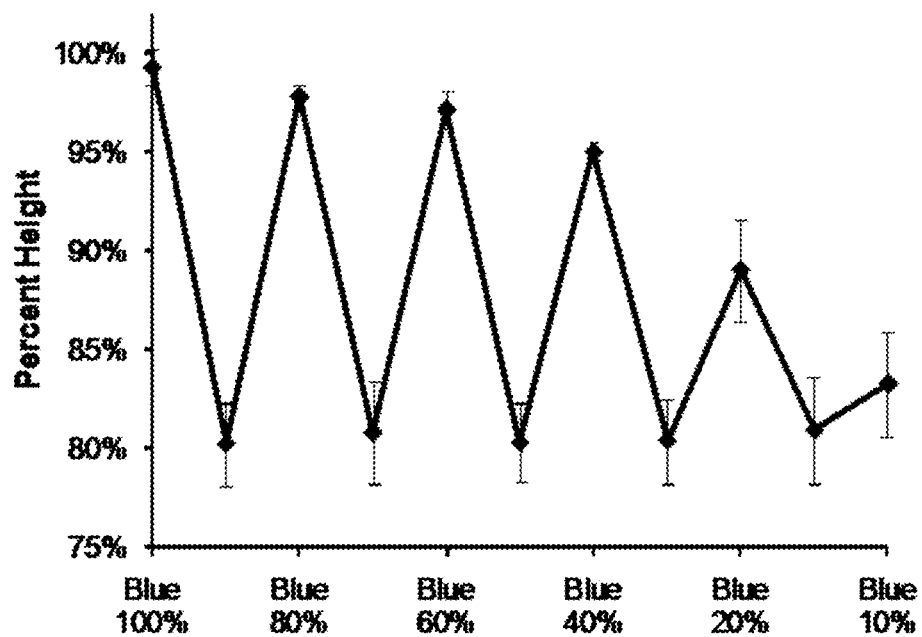
FIG. 8A shows azobenzene nanoparticle fractional height change in response to 100% power output of blue light intensity at 4.5 mW/cm$^2$
Figure 8B:
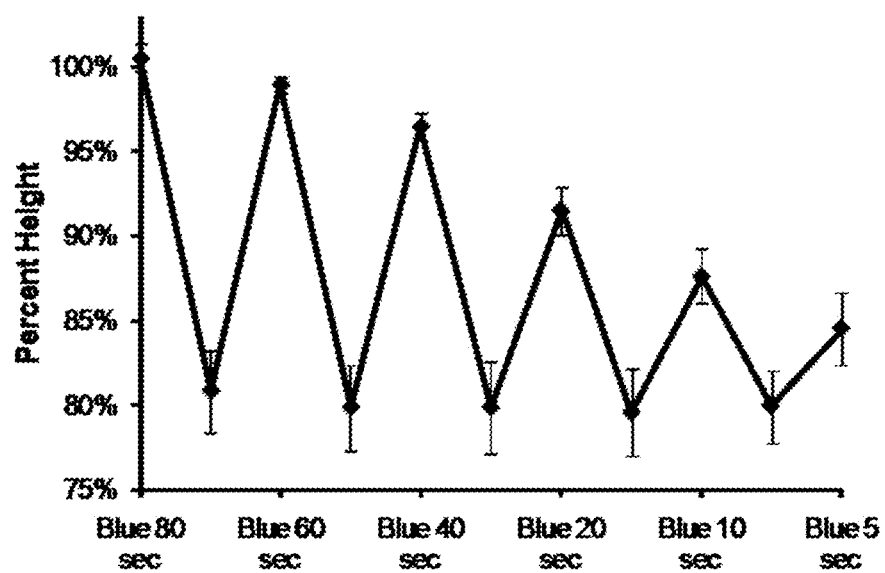
FIG. 8B shows height changes in response to exposure time.

The same procedures were used to study the effect of intensity and irradiation time of 430 nm blue light on the extension magnitude of the azobenzene nanoparticles. The UV source was maintained at 19 mW/cm$^2$ for 30 sec to generate the maximum contraction and the blue light exposure time was kept at 80 sec. The results showed that the extension magnitude increased as the blue light intensity increased, reaching a maximum at 3.6 mW/cm$^2$ (80% of maximum power output), as seen in FIG. 8A. When the blue light intensity was kept at 4.5 mW/cm$^2$, the extension magnitude increased as exposure time increased, until it reached a maximum at 80 sec of exposure time, as seen in FIG. 8B.

All publications mentioned herein are hereby incorporated by reference for the purpose of disclosing and describing the particular materials and methodologies for which the reference was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

DOCUMENTS CITED (1) Barrett, C. J.; Mamiya, J.-i.; Yager, K. G.; Ikeda, T. *Soft Matter* 2007, 3, 1246.

(2) Yager, K. G.; Barrett, C. J. *J. Photochem. & Photobio. A* 2006, 182, 250.

(3) Finkelmann, H.; Nishikawa, E. *Phy. Rev. Lett.* 2001, 87, 015501.

(4) Li, M.-H.; Keller, P.; Li, B.; Wang, X.; Brunet, M. *Adv. Mater.* 2003, 15, 569.

(5) Kondo, M.; Miyasato, R.; Naka, Y.; Mamiya, J.-i.; Kinoshita, M.; Yu, Y. *Liquid Crystals* 2009, 36, 1289.

(6) Kondo, M.; Yu, Y.; Ikeda, T. *Angew. Chem. Int. Ed.* 2006, 45, 1378.

(7) Yamada, M.; Kondo, M.; Miyasato, R.; Naka, Y.; Mamiya, J.-i.; Kinoshita, M.; Shishido, A.; Yu, Y.; Barrett, C. J.; Ikeda, T. *J. Mat. Chem* 2009, 19, 60.

(8) Li, Y.; He, Y.; Tong, X.; Wang, X. *J.A.C.S.* 2005, 127, 2402.

(9) Liu, J.; He, Y.; Wang, X. *Langmuir* 2009, 25, 5974.

(10) Lambeth, R. H.; Moore, J. S. *Macromolecules* 2007, 40, 1838.

(11) Yang, Z.; Huck, W. T. S.; Clarke, S. M.; Tajbakhsh, A. R.; Terentjev, E. M. *Nat. Mater.* 2005, 4, 486-490.

(12) Spillmann, C. M.; Naciri, J.; Wahl, K. J.; III, Y. H. G.; Chen, M.-S.; Ratna, B. R. *Langmuir* 2009, 25, 2419-2426.

(13) Vennes, M.; Zentel, R.; Rossle, M.; Stepputat, M.; Kolb, U. *Advanced Materials* 2005, 17, 2123.

(14) Tongcher, 0.; Sigel, R.; Landfester, K. *Langmuir* 2006, 22, 4504.

(15) Spillmann, C. M.; Ratna, B.; Naciri, *J. Appl. Phys. Lett.* 2007, 90, 021911.

(16) Y. Deng, N. Li, Y. He, X. Wang; *Macromolecules.* 40, 2007. p. 6669-6678

What is claimed is:

1. A photoresponsive particle actuator comprising:

a particle having a layered smectic ordering and including a photoresponsive moiety selected from the group consisting of azobenzene, stilbene, and spiropyran, wherein the particle is less than about one micron in diameter and exhibits a reversible shape change upon exposure to light, wherein the photoresponsive particle actuator is in a condition of having been formed from a surfactant and at least two polymer precursors, wherein each polymer precursor comprises azobenzene as said photoresponsive moiety, flanked by alkyl chains having from 4 to 10 carbons, and wherein the surfactant and at least one of the at least two polymer precursors comprise a crosslinking moiety selected from the group consisting of acrylate, vinyl ether, and epoxide.

2. The photoresponsive particle actuator of claim 1, wherein each polymer precursor further comprises a backbone-forming moiety selected from the group consisting of acrylate, norbornene, and siloxane.

3. The photoresponsive particle actuator of claim 1, wherein said at least two polymer precursors are

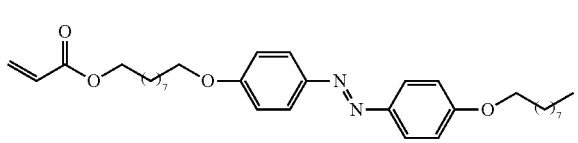

and

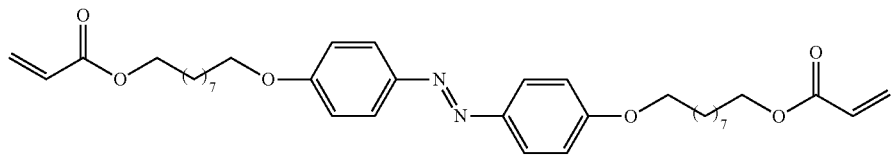

and the surfactant

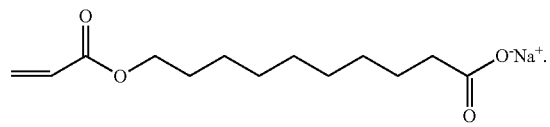

4. The photoresponsive particle actuator of claim 1, having the form of an oblate spheroid with a size of from 50 nanometers to one micron.

5. The photoresponsive particle actuator of claim 1, comprising a surfactant having a carboxylate, sulfonate, imidazole, or amine group.

6. A method of making photoresponsive particle actuators, the method comprising:
   (a) combining at least two polymer precursors with an aqueous solution comprising a surfactant to form an emulsion, and
   (b) crosslinking the emulsion to create photoresponsive particle actuators,
   wherein the photoresponsive particle actuators have a layered smectic ordering and include a photoresponsive moiety selected from the group consisting of azobenzene, stilbene, and spiropyran, and
   wherein the photoresponsive particle actuators are less than about one micron in diameter and exhibit a reversible shape change upon exposure to light.

7. The method of claim 6, wherein:
   each polymer precursor comprises azobenzene as said photoresponsive moiety, flanked by alkyl chains having from 4 to 10 carbons, and
   wherein the surfactant and at least one of the at least two polymer precursors comprise a crosslinking moiety selected from the group consisting of acrylate, vinyl ether, and epoxide.

8. The method of claim 6, wherein each polymer precursor further comprises a backbone-forming moiety selected from the group consisting of acrylate, norbornene, and siloxane.

9. The method of claim 6, wherein said polymer precursors are

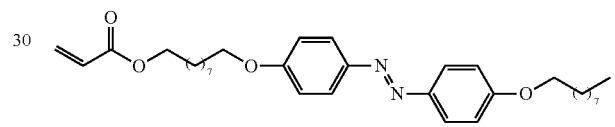

and

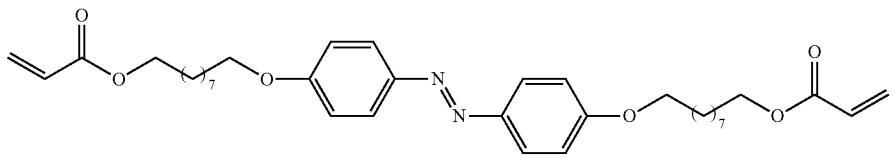

and said surfactant is

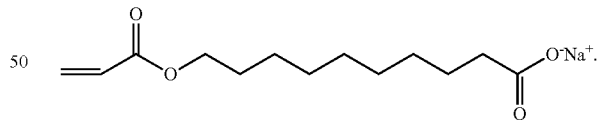

10. The method of claim 6, wherein said surfactant comprises a carboxylate, sulfonate, imidazole, or amine group.

* * * * *